United States Patent [19]

Idei et al.

[11] 4,221,560
[45] Sep. 9, 1980

[54] APPARATUS FOR REGENERATION OF WET SPENT ACTIVE CARBON

[75] Inventors: Hideji Idei; Mitsuhiko Iwasaki, both of Yokohama; Michio Ito, Yokosuka; Toshimichi Hirabayashi, Tokyo; Zenji Matsumoto, Izumi; Nobutaka Ninomiya, Nagaokakyo, all of Japan

[73] Assignees: JGC Corporation, Tokyo; Takeda Chemical Industries, Ltd., Osaka, both of Japan

[21] Appl. No.: 949,985

[22] Filed: Oct. 10, 1978

[30] Foreign Application Priority Data

Oct. 20, 1977 [JP] Japan ............................ 52-125184

[51] Int. Cl.³ ............................................. F27B 15/10
[52] U.S. Cl. ........................................ 432/99; 34/168; 201/34; 252/418; 432/102
[58] Field of Search ........................... 432/95–102, 432/14; 34/86, 168, 167; 202/418, 420, 445; 252/418, 420, 445; 201/34; 110/221, 293, 108

[56] References Cited

U.S. PATENT DOCUMENTS

| 3,329,107 | 7/1967 | Hatchel et al. .................. 110/221 |
| 4,120,644 | 10/1978 | Numasaki et al. ................ 34/168 X |

Primary Examiner—Edward G. Favors
Attorney, Agent, or Firm—Blanchard, Flynn, Thiel, Boutell & Tanis

[57] ABSTRACT

The present invention provides an apparatus for the regeneration of wet spent active carbon devised so as to bring the active carbon supplied from a hopper into contact with a reaction gas generated or heated to high temperature in a furnace, wherein an exhaust duct for the high-temperature exhaust gas from the furnace is installed penetrating the hopper in order to heat the active carbon descending therein and a condensate collecting header for discharging water separated from the active carbon is disposed at the lower part of the hopper.

8 Claims, 3 Drawing Figures

APPARATUS FOR REGENERATION OF WET SPENT ACTIVE CARBON

BACKGROUND OF THE INVENTION a. Field of the Invention

The present invention relates to an apparatus for regenerating wet spent active carbon by heating same at high temperatures.

b. Description of the Prior Art

With the recent strengthening of the controls on the discharge of various kinds of waste water, the use of the active carbon adsorption method, as an advanced treating method, is on the increase. At the same time, an apparatus for the regeneration of spent active carbon is also regarded as constituting an important factor of waste water treating measures. The spent active carbon to be subjected to regeneration is usually submerged, that is, held in the state of being mixed with water so as to be convenient for handling at the time of storing, transport, etc. Accordingly, when it is supplied to a regeneration apparatus, it is ordinarily supplied as wet spent active carbon after separating most of the water beforehand by means of a mechanical solid-liquid separation device.

As the means for the regeneration of wet spent active carbon, there have hitherto been adopted an apparatus which is devised so that the spent active carbon-to-be-treated is allowed to descend within a regeneration tube made of a heat resisting metal which is installed inside a heating furnace while heating it indirectly from the outside by means of a high-temperature combustion gas (which is obtained from the combustion of fuel) and supplying a regeneration gas such as steam or an appropriate reaction gas by way of the lower part of said tube so as to contact the spent active carbon, an apparatus which is devised so that spent active carbon-to-be-treated is introduced into a fluidized bed type furnace employing a high-temperature combustion gas as a fluidizing medium, thereby heating the spent active carbon directly with said combustion gas as well as bringing it in contact with said gas, or an apparatus which is devised so that the spent active carbon is first supplied to the uppermost hearth of a multi-hearth furnace (Herreschoff Furnace) and is scraped so as to fall onto the lower hearth in succession while supplying a high-temperature combustion gas from the lower part of said furnace, thereby heating the spent active carbon directly with the combustion gas as well as bringing it in contact with the same. All of these conventional regeneration apparatuses are supposed to perform the regeneration through three fundamental process steps of drying, calcination and reactivation. However, since the wet spent active carbon-to-be-treated usually contains a fair quantity of water, even after a dewatering treatment, the process of drying by evaporating said water in the conventional regeneration apparatuses entails a great thermal load, resulting in economical inferiority of these apparatuses. Hence, there has previously been proposed an apparatus which combines the foregoing indirect-heating type regeneration apparatus with an evaporation type drier utilizing a high-temperature exhaust gas arising from the apparatus as the source of heat for drying and installed outside the heating furnace (cf. U.S. Pat. No. 4,008,994). According to the proposed apparatus, as the spent active carbon can be almost dried through evaporation beforehand by virtue of the sensible heat of a high-temperature exhaust gas within the drier and thereafter calcined and reactivated within the regeneration tube, not only the quantity of fuel comsumption but also the quantity of expensive heat-resisting metallic material required can be reduced compared with the conventional indirect-heating type regeneration apparatuses. However, this apparatus is still defective in that there is a necessity for providing a special drying means in recovering the heat of said exhaust gas, entailing a great deal of cost of equipment.

SUMMARY OF THE INVENTION

The primary object of the present invention is to provide an apparatus for the regeneration of wet spent active carbon, which manifests a drastically improved heat economization effect compared with the conventional apparatuses.

The secondary object of the present invention is to provide an apparatus for the regeneration of wet spent active carbon, which can perform the recovery of the heat of the exhaust gas without resorting to any special drying means and is therefore more economical compared with the above proposed regeneration apparatus devised to recover the heat of the exhaust gas.

In other words, the present invention provides an apparatus for the regeneration of wet spent active carbon devised so to bring the active carbon supplied from a hopper into contact with a reaction gas generated or heated to a high temperature in a furnace, wherein an exhaust duct for high-temperature exhaust gas from the furnace is installed penetrating the hopper in order to heat the active carbon descending therein and a condensate collecting header for discharging water separated from the active carbon is disposed at the lower part of the hopper.

In the conventional apparatuses for the regeneration of wet spent active carbon, employment of a hopper for introducing said active carbon into the apparatus is a usual practice, but the hopper has been supposed to function merely as a supply device. The present inventors, however, have observed the behavior of water contained in the wet spent active carbon and have found the fact that, when said active carbon is heated within the hopper, the water which accompanies the active carbon particles and which was not removed by the prior mechanical separation moves toward the wall side (cold side) of the hopper from mainly the region that is in contact with the wall of the duct through which high temperature exhaust gas is flowed, whereby a large quantity of water gathers along the wall side of the hopper. This gathering of a large quantity of water is presumed to be ascribable to the repetition of the cycle of evaporating water near the wall of the exhaust duct, moving the vapour toward the wall side of the hopper and condensing the vapour through radiation of heat at the cold wall surface of the hopper, that is, a continuous evaporation-condensation mechanism. In the present invention, a major part of the water liberated from the active carbon is thus drawn out in liquid state from a condensate collecting header installed at the lower part of the hopper, and at the same time a part of the liberated water is discharged through a vapor exhaust pipe provided at the top of hopper, whereby a drastic improvement can be expected with regard to the economization of heat and the cost of equipment compared with the conventional regeneration apparatuses.

Hereunder will be explained the construction of the apparatus of the present invention with reference to the appended drawings, together with the effect of the adoption of such a construction with reference to embodiments thereof.

BRIEF DESCRIPTION OF THE DRAWINGS

FIG. 1 illustrates an embodiment of the concept of the present applied to an indirect-heating type regeneration apparatus which is devised to perform the regeneration of wet spent active carbon by a process comprising allowing the active carbon to descend within a regeneration tube made of a heat resisting metal installed inside a heating furnace while indirectly heating the active carbon with a high-temperature combustion gas supplied from a burner (or burners) installed in the heating furnace and also bringing the active carbon in contact with a regeneration gas, such as steam, supplied from the lower part of said regeneration tube. In FIG. 1, the reference numeral 1 denotes the heating furnace proper having a single or a plurality of burners 2, and a regeneration tube 3 is installed in about the center thereof. This regeneration tube 3 consists of an outer tube 3a and an inner tube 3b disposed concentrically within said outer tube. In between the outer tube 3a and inner tube 3b there is formed a regeneration chamber 3c having an annular cross-section. The spent active carbon submerged within a storage tank (not shown in the drawings) is supplied to a hopper 4 after draining off water by means of a dewatering supplying device 13 such as screw conveyor mounted in an inclined position on the hopper 4. The hopper 4 is of inverted conical shape, and the lower end thereof is connected to the upper end of the foregoing outer tube 3a. The aforesaid inner tube 3b penetrates about the center of the hopper 4, and is further connected to a stack 6 through an expansion joint 5. The upper part of the inner tube 3b within the hopper 4 thus functions as a duct for exhaust gas, i.e., as an exhaust duct 14. The wet spent active carbon that descends inside the hopper 4 is then indirectly heated through the tube walls with a high-temperature combustion gas supplied from the burner (burners) 2 of the heating furnace 1 while descending in the aforesaid regeneration chamber 3c and is also brought in contact, in counter current fashion, with steam supplied from the steam supply pipe 7 installed in the lower part of the regeneration chamber 3c, whereby the regeneration is performed. Besides, the wall of the outer regeneration tube is provided with a multiplicity of penetrating holes through which the steam, as reaction gas, flows out into the combustion gas together with substances liberated in the course of the regeneration of active carbon. In this way, the regenerated active carbon is drawn out by a proper quantity by an appropriate product discharging means 8, such as table feeder, equipped at the lower end of the regeneration chamber 3c.

Figure 1:
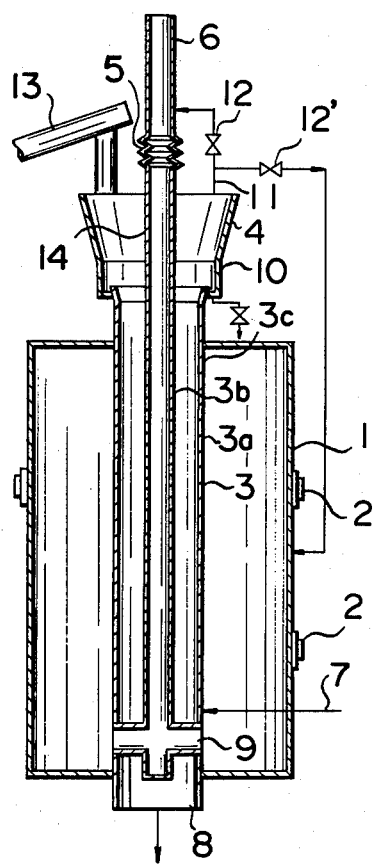
FIG. 1 is a sectional view of a regeneration apparatus embodying the present invention.

In the case of the embodiment illustrated in FIG. 1, the apparatus is so constructed as to heat the spent active carbon descending within the regeneration chamber 3c having an annular cross-section, as formed between the outer tube 3a and the inner tube 3b, from both sides of the wall of the outer tube and the wall of the inner tube and an interconnecting duct 9 is provided in the lower part of the outer tube 3a as a means for introducing the combustion gas from the burner (burners) 2 into the inner tube 3b. In this way, the combustion gas ascends within the inner tube 3b, and further flows in the exhaust duct 14 of the hopper 4 to heat the wet spent active carbon therein. Meanwhile, a considerable quantity of water accompanied by the active carbon particles moves toward the wall side of the hopper according to the aforementioned mechanism and eventually descends along the wall thereof. On this occasion, the water accompanied by the active carbon particles comes to be easily separated from said particles with the elevation of temperature and its descent is also accelerated, and the separated water is discharged from a condensate collecting header 10 installed at the lower part of the hopper 4 to the outside of the system. At the same time, the remnant of said water evaporates and is drawn out from a vapour exhaust pipe 11 provided on the top of the hopper 4, introduced into the stack 6 and/or the heating furnace 1 by way of a valve 12 and/or a valve 12' as occasion demands, and finally discharged into the air together with the exhaust gas arising from the apparatus. However, this exhaust vapour occasionally contains harmful or ordorous substances adsorbed to the active carbon, and therefore, in the case where direct discharge thereof into the air is undesirable, it is preferable to introduce said exhaust vapour into the heating furnace 1 by way of the valve 12' and make it harmless through incineration therein.

Next, some embodiments of application of the concept of the present invention to direct-heating type regeneration apparatuses such as fluidized-bed type regeneration apparatus and multi-hearth furnace (Herreschoff Furnace) type regeneration apparatus will be explained hereinafter with reference to FIG. 2 and FIG. 3.

Figure 2:
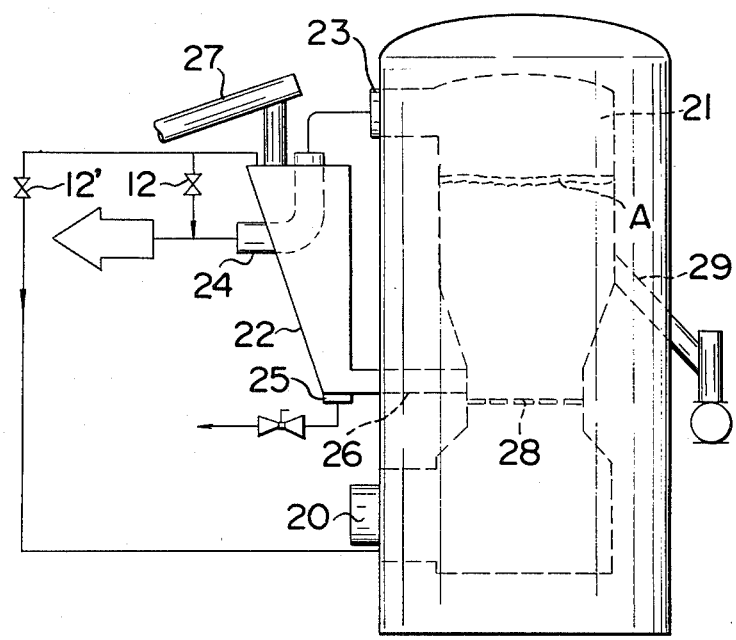
FIGS. 2 and 3 are, respectively, schematic representations of modified regeneration apparatuses embodying the present invention.

In FIG. 2, the wet spent active carbon subjected to dewatering treatment by means of a dewatering/supplying device 27 such as a screw feeder and supplied into a hopper 22 is heated with a high-temperature exhaust gas from a funnel 23 installed on the top of a fluidized-bed type regeneration furnace 21 through the medium of the wall surface of an exhaust duct 24 disposed inside the hopper 22, while said carbon descends within said hopper. In this way, the water separated within the hopper 22 gathers in a condensate collecting header 25 like in the case of the apparatus illustrated in FIG. 1, and thence is discharged to the outside of the system. Besides, the vapour remaining within the hopper 22 is led into the stack (not shown) and/or a high-temperature gas generating chamber by means of the valve 12 and/or the valve 12'. Further, in case of need, this vapour can be led into the fluidized bed. Meanwhile, the spent active carbon is supplied to the upper part of a dispersing plate 28 installed within the regeneration furnace 21, fluidized by a high-temperature combustion gas from a burner (or burners) 20 and, at the same time, brought in direct contact with the same combustion gas, whereby the regeneration thereof is performed. The thus regenerated active carbon is drawn out through an outlet nozzle 29 disposed below the fluidizing surface A. Moreover, in this instance too, it is possible to introduce a regeneration gas, such as steam, into the regeneration furnace 21 by way of an appropriate place so as to accelerate the regeneration.

Figure 3:
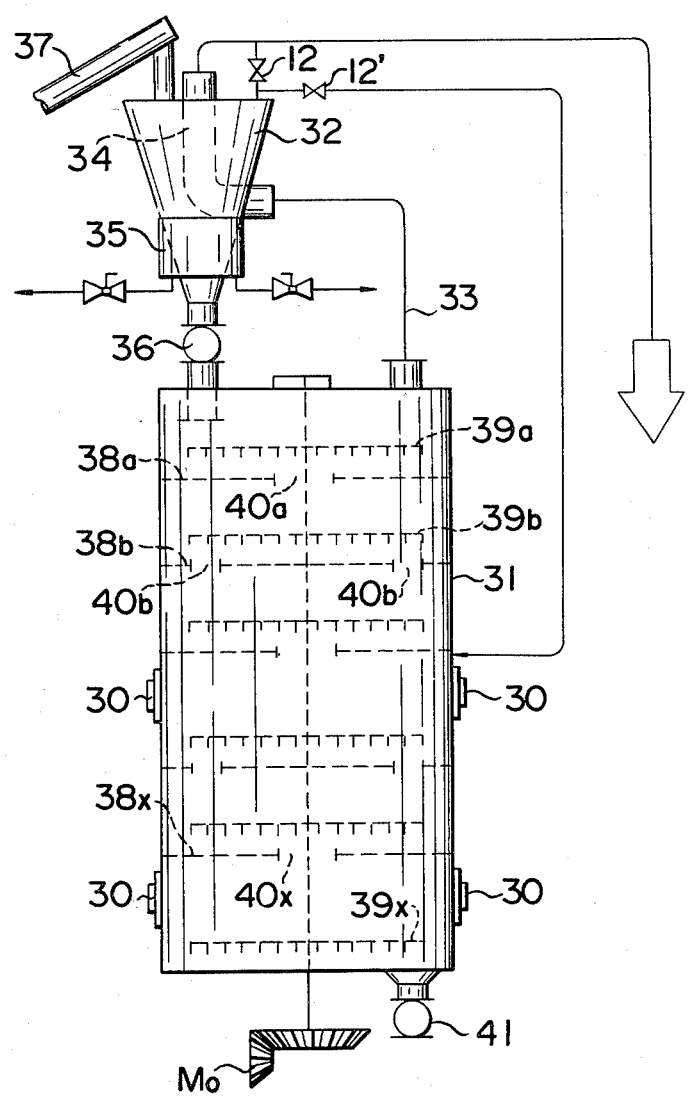

Next, to explain the embodiment illustrated in FIG. 3, the wet spent active carbon subjected to a dewatering treatment and supplied to a hopper 32 by means of a dewatering/supplying device 37 such as a screw feeder, as in the case of the embodiment illustrated in FIG. 2, is heated with a high-temperature exhaust gas from a conduit 33 installed on the top of a multi-hearth type regeneration furnace 31 through the medium of the wall surface of an exhaust duct 34 disposed inside the hopper 32 while said carbon descends within said hopper. The water separated in this way within the hopper 32 gathers in a condensate collecting header 35 and then is discharged to the outside of the system. Besides, the vapour remaining within the hopper 32 is led into the stack (not shown) and/or a regeneration chamber by means of the valve 12 and/or the valve 12'. Meanwhile, the spent active carbon is allowed to fall on the shelf plate 38a of the uppermost hearth installed inside a multi-hearth type regeneration furnace 31 by means of a feeder 36 and is moved on said shelf plate 38a toward its center by means of a scraper 39a rotating at the central part of the regeneration furnace 31. The active carbon thus scraped together on the uppermost shelf plate 38a falls through an opening 40a onto the shelf plate 38b of the next hearth, moved outwards by means of a scraper 39b in the same fashion as above, and falls onto the next plate through an opening 40b. During the repetition of said falling from upper hearth to lower hearth, the spent carbon is brought in contact with a high-temperature combustion gas from the burner (or burners) 30, whereby the regeneration of the spent carbon is effected. The regenerated active carbon on the shelf plate 38x of the lowermost hearth is scraped together by means of a scraper 39x after passing through an opening 40x, and is finally drawn out through a product discharge device 41. Even in this regeneration apparatus, the regeneration gas can of course be suitably introduced from an appropriate place.

The above described regeneration apparatuses are no more than a few embodiments of the regeneration apparatus according to the present invention, and it goes without saying that the present invention is applicable to any modification of these apparatuses.

Hereunder shown are examples embodying the present invention.

DESCRIPTION OF THE PREFERRED EMBODIMENTS

Example

Part of the water present in used active carbon from the water treatment plant in an oil refinery was drained within a screw feeder (the resulting wet spent active carbon contained water almost equivalent to the net weight of the active carbon proper) and thereafter was subjected to a regeneration treatment under the following conditions by the use of an apparatus illustrated in FIG. 1.

| Conditions for operation: | |
|---|---|
| Temperature within the upper part of heating furnace | 840° C. |
| Temperature within the upper part of regeneration chamber | 242° C. |
| Temperature within the stack | 445° C. |
| Feed rate: | |
| Wet spent active carbon | 166.7 Kg/hr (including accompanied moisture 76.7 Kg/hr) |
| Fuel (gas from coke oven) | 74 Nm³/hr (=326,000 Kcal/hr) |
| Quantity of air for combustion | 500 Nm³/hr |
| Quantity of steam for regeneration | 30 Kg/hr |

The results of the foregoing regeneration treatment was as follows:

| | |
|---|---|
| Quantity of water discharged from the condensate collecting header | 24.7 Kg/hr |
| Quantity of vapour discharged through the vapour exhaust pipe | 14.4 Kg/hr |
| Quantity of fuel consumed per Kg of active carbon-to-be-regenerated | 2,480 Kcal |

On the other hand, when the regeneration of wet spent active carbon was performed using the present apparatus in the same way as above save for omitting the drawing-out of the water from the condensate collecting header, the quantity of the fuel consumed per Kg of spent active carbon-to-be-regenerated was 3,500 Kcal.

What we claimed is:

1. An apparatus for the regeneration of wet spent active carbon comprising a hopper and a furnace arranged so that active carbon supplied from the hopper contacts a reaction gas generated or heated to a high temperature in the furnace, an exhaust duct for passing high-temperature exhaust gas from the furnace, said duct being installed penetrating the hopper whereby active carbon descending in said hopper is heated by the high-temperature exhaust gas flowing through said duct, and a condensate collecting header disposed at the lower part of the hopper for discharging water separated from the active carbon.

2. An apparatus according to claim 1, including a regeneration chamber made of heat-resistive material and arranged so that the active carbon is contacted with the reaction gas therein, said regeneration chamber being disposed vertically inside said furnace, the uppermost end of said regeneration chamber being connected with the bottom end of said hopper and said exhaust duct being installed penetrating the hopper and connected with said furnace for receiving high-temperature exhaust gas therefrom.

3. An apparatus according to claim 1, including a regeneration chamber having annular cross-section and composed of an inner tube and an outer tube both made of heat-resistive material, said regeneration chamber being disposed vertically inside said furnace, said inner tube being closed at its bottom end, said inner tube communicating with the combustion zone of said furnace by way of an interconnecting duct at the lower region thereof, said inner tube being connected to the bottom end of said exhaust duct at the upper end thereof, said outer tube being connected to the bottom end of the hopper at the upper end of said outer tube.

4. An apparatus according to claim 1, wherein said furnace is of fluidized-bed type having an exhaust gas discharge funnel and said exhaust duct is connected to said funnel.

5. An apparatus according to claim 1, wherein said furnace is of multi-hearth type having an exhaust gas discharge funnel and said exhaust duct is connected to said funnel.

6. An apparatus according to claim 1, claim 2, claim 3, claim 4 or claim 5, wherein a vapour exhaust pipe is provided on the top of said hopper in order to introduce the vapour generated in the hopper into the furnace and/or the stack which is connected to the outlet of the exhaust duct.

7. An apparatus for regenerating wet spent active carbon, comprising: an upright funnel-shaped hopper for containing a supply of wet spent active carbon, said hopper having an inlet opening adjacent to its upper end for loading same with wet spent active carbon and a discharge opening at its lower end for discharging wet spent active carbon therefrom; a furnace connected for receiving wet spent active carbon from said discharge opening of said hopper, said furnace including means for heating said wet spent active carbon for regenerating same whereby to produce a high temperature exhaust gas, said furnace having an outlet duct for discharging said high temperature exhaust gas from said furnace, said outlet duct passing through the interior of said hopper and thence outwardly therefrom, said outlet duct being adapted for indirect heat exchange contact with the wet spent active carbon in said hopper for heating the wet spent active carbon to evaporate water therefrom; and a condensate collecting header located at the lower portion of said hopper for removing liquid water that separates from the wet spent active carbon in the lower portion of said hopper and for discharging the liquid water outside said hopper.

8. An apparatus as claimed in claim 7 including a vapor discharge pipe communicating with the interior of said hopper adjacent to the upper end thereof for removing vapor from the upper end of said hopper.

* * * * *